(12) United States Patent
Zablocki et al.

(10) Patent No.: US 6,731,761 B1
(45) Date of Patent: May 4, 2004

(54) WIRELESS REMOTE SPEAKERS FOR AN AUTOMOTIVE VEHICLE

(75) Inventors: Daniel P. Zablocki, Clay Township, MI (US); Peter J. Didyk, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/522,385

(22) Filed: Mar. 10, 2000

(51) Int. Cl.[7] .............................. H04A 5/00; H04B 1/00; H04B 3/00

(52) U.S. Cl. ............................... 381/86; 381/2; 381/79; 381/77

(58) Field of Search ................................. 381/86, 2, 16, 381/77, 79, 334, 389; 455/66, 345, 346; 340/568.1

(56) References Cited

U.S. PATENT DOCUMENTS

| | | | | |
|---|---|---|---|---|
| 3,927,316 A | | 12/1975 | Citta | |
| 4,580,653 A | * | 4/1986 | Owens | 181/141 |
| 4,790,407 A | * | 12/1988 | Yamamoto et al. | 181/141 |
| 4,933,921 A | | 6/1990 | Saunders | |
| 5,228,090 A | * | 7/1993 | Marler | 381/332 |
| 5,243,640 A | * | 9/1993 | Hadley et al. | 379/421 |
| 5,668,884 A | | 9/1997 | Clair, Jr. et al. | |
| 5,790,065 A | * | 8/1998 | Yaroch | 340/438 |
| 5,946,343 A | * | 8/1999 | Schotz et al. | 375/141 |
| 6,114,958 A | * | 9/2000 | Murphy | 340/568.1 |

* cited by examiner

Primary Examiner—Forester W. Isen
Assistant Examiner—Brian Tyrone Pendleton

(57) ABSTRACT

A remote speaker system (14) for an automotive vehicle (10) has a holder (22) fixedly mounted within the vehicle (10). A speaker assembly (19) having a speaker housing (20) coupled to holder (22) and a speaker (26) coupled within the housing (20). A receive circuit (48) is coupled within the housing (20) and is electrically coupled to the speaker (26). A control circuit has an audio receiver generating audio signals and a transmit circuit (44) transmitting a wireless communication signal in response to the audio signal. The receive circuit (48) receives the wireless communication signal and converts the wireless communication signal into an audio electrical signal. The speaker converts the audio electrical signal into an audible signal.

9 Claims, 2 Drawing Sheets

WIRELESS REMOTE SPEAKERS FOR AN AUTOMOTIVE VEHICLE

TECHNICAL FIELD

The present invention relates generally to audio systems for automotive vehicles, and more particularly, to wireless speakers for the audio system.

BACKGROUND

Audio systems for automotive vehicles typically have four or more speakers that are fixedly mounted within the automotive vehicle to provide sound from the audio system into the passenger compartment of the vehicle. The connections between the controller and the speakers are hardwired into the vehicle. Also, portions of the vehicle are typically formed to provide a speaker cavity to allow the proper sound to be emitted from the speaker.

At various times, however, it may be desirable to direct the sound from within the vehicle outside the vehicle. For example, such places may include at a picnic, at the beach, or other locations remote from a person's home audio equipment. Commonly to do this, the vehicle doors are left open or the windows are rolled down. However, the sound is distorted because the speakers are tuned to provide the optimum sound within the passenger compartment of the vehicle. Thus, the sound cannot be directed where desired.

It would therefore be desirable to provide removable audio speakers from the vehicle so that sound from the audio system of the vehicle may be directed as desired.

SUMMARY OF THE INVENTION

One object of the invention is to provide speakers that are removable from the vehicle to allow sound to be directed in a more desirable manner.

In one aspect of the invention, a remote speaker system for an automotive vehicle has a holder that is fixedly mounted within the vehicle. A speaker assembly having a speaker housing is removably coupled to the holder. A speaker is coupled within the housing. A receive circuit is coupled within the housing and is electrically coupled to the speaker. A control circuit having an audio receiver generates audio signals and a transmit circuit for transmitting a wireless communication signal in response to the audio signal. The receiver receives the wireless communication signal and converts the wireless communication signal into an audio electrical signal. The speaker converts the audio electrical signal into an audible signal.

One feature of the invention is that the controller may be coupled to an indicator to indicate to the driver that the speakers are being left behind.

Another feature of the invention is that if the vehicle has a cellular phone, the cellular phone may be coupled to the controller so that the controller sends a signal to the remote speakers when the phone is ringing.

Yet another feature of the invention is that the removable speaker may be mounted within the trunk of the vehicle on a slide bar mechanism to allow the speaker to recharge while not in use. Of course, the teachings of the present invention may be modified to allow the speaker to be located anywhere in the vehicle. Also, the slide bar may be made glow-in-the-dark for locating purposes.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
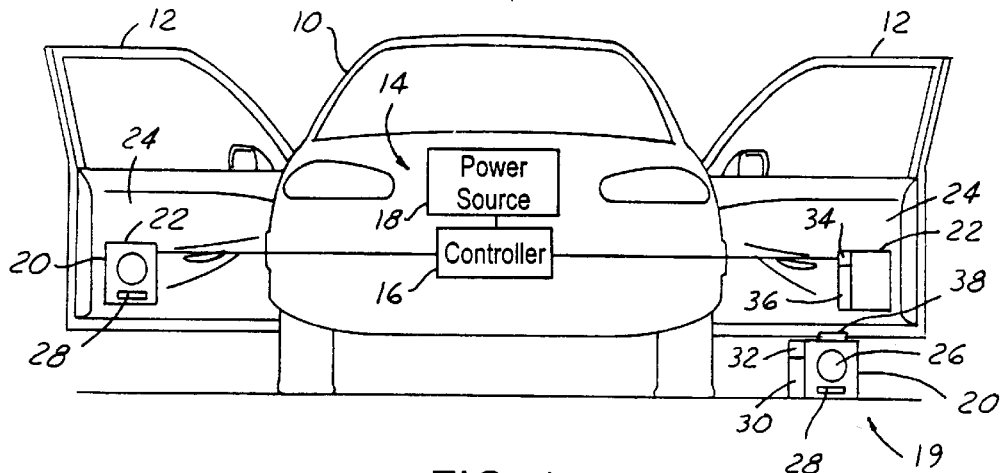
FIG. 1 is a rear elevational view of an automotive vehicle having remote speakers according to the present invention.

In the following figures, the same reference numerals are used to identify the identical components in the various views. Various alternative embodiments such as different mounting positions for the speaker and holders would be evident to those skilled in the art.

Referring now to FIG. 1, an automotive vehicle 10 is illustrated having doors 12. Automotive vehicle 12 has a remote speaker system 14 incorporated therein. Remote speaker system 14 has a controller 16 and a speaker assembly 19. Controller 16 is preferably microprocessor-based. Controller 16 as will be further described below performs similar functions to that of a receiver for an audio system of an automotive vehicle. However, controller 16 may also perform further functions. Although only one controller 16 is illustrated, more than one controller may be used to implement the present invention. Controller 16 is coupled to a power source 18. Power source 18 may, for example, be the battery supply for the entire automotive vehicle 10. Controller 16 is coupled to speaker housing 20. In this embodiment, speaker housing 20 of speaker assembly 19 is mounted within a holder 22 within door 12. Holder 22, as illustrated, is sized to receive speaker housing 20 therein. Preferably, when speaker housing 20 is mounted within holder 22, speaker housing 20 extends minimally from the inside panel 24 of door 12.

In this embodiment holder 22 may be integrally formed within door panel 24. Commonly, door panels 24 are formed of plastic material.

Speaker housing 20 is also preferably formed of a plastic material. Speaker housing 20 has a speaker 26 located therein. Speaker 26 receives audio signals from controller 16 and converts them to audible signals. Speaker housing 20 has a speaker control circuit 28 located therein. As will be further described below, speaker control circuit 28 may include the receiving and processing circuitry for speaker control. Speaker housing 20 is preferably weatherproof. Also, speaker 26 is also preferably weatherproof. Various outdoor-type speakers suitable for implementation into speaker housing 20 are readily available in the audio industry.

Speaker housing 20 preferably has a rechargeable battery 30 and operates in a wireless manner when removed from holder 22. Housing 20 also has an electrical connector 32. Electrical connector 32 is electrically connected to speaker control circuitry 28 so that a direct electrical connection may be made between controller 16 and speaker control circuitry 28 when the speaker is within holder 22. Although, those skilled in the art would also recognize that a completely wireless system without electrical connector 32 may be provided A separate battery connector 36 may be used to connect battery 30 within holder 22. However, as would be evident to those skilled in the art, a single connector may be used in place of electrical connector 32 and battery connector 36. Also, a battery charger may be incorporated into battery connector 36. However, as would be evident to those skilled in the art, a battery charger may also be incorporated within speaker housing 20.

A handle 38 may also be incorporated onto speaker housing 20. Handle 38 may, for example, be a pop-up handle to prevent interference from inserting speaker housing 20 into holder 22. Handle 38 may be formed from a variety of materials including plastic material similar to that of speaker housing 30. Handle 38 may also be glow-in-the-dark to allow easy location of the handle in unlit conditions.

Figure 2:
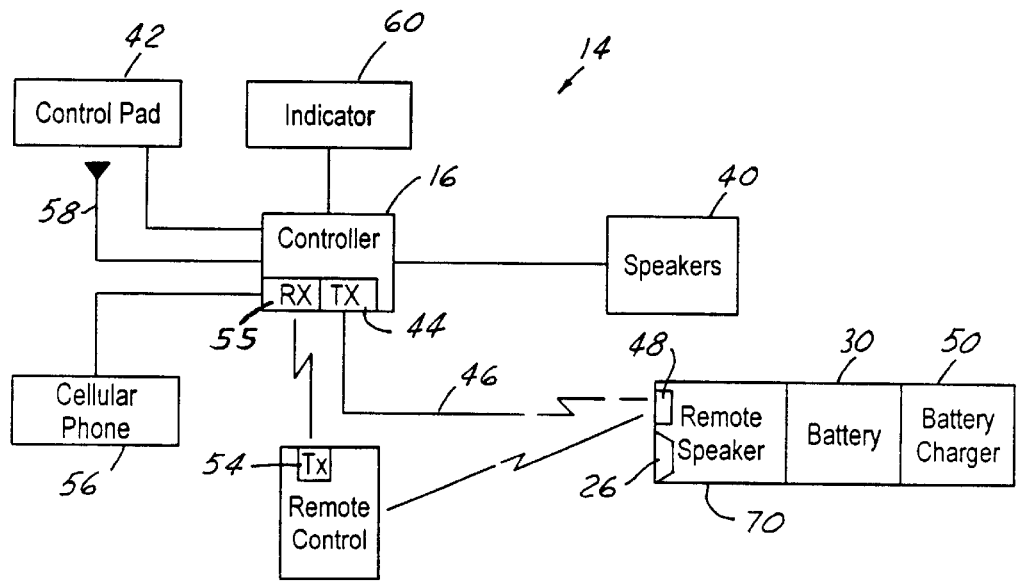
FIG. 2 is a functional block diagram of a remote speaker system according to the present invention.

Referring now to FIG. 2, a system block diagram of remote speaker system 14 is illustrated. Remote speaker system 14 may also incorporate hardwired speakers 40. If only two remote speakers are desired, two or more hardwired speakers 40 may be used. For example, speakers 40 may be incorporated into the rear portion of the vehicle if the front speaker housings 20 are made removable. Conversely, if the front speakers of the audio system are fixed then rear speakers may be hardwired speakers 40. Optionally, no hardwired speakers may be provided in a system. Controller 16 has a control pad 42 coupled thereto. Control pad 42 may comprise a plurality of buttons or knobs fixedly attached to the instrument panel. Control pad 42 may, for example, have volume control buttons, station control buttons, preset station controls, a tuning knob, volume, bass, and treble controls. Of course, various other controls would be evident to those skilled in the art.

Controller 16 has a transmitter 44 that is used to generate a wireless communication signal 46 to speaker housing 20. Transmitter 44 may be of a variety of types as would be evident to those skilled in the art. Transmitter 44 may be an FM transmitter, an infrared transmitter, or other type of RF transmitter. Speaker housing 20 has a receive circuit 48 coupled therein. Receive circuit 48 is configured to received the wireless communication signals 46. Receive circuit 48 converts the wireless communication signal into an electric audio signal which is communicated to speaker 26. Speaker 26 converts the electrical audio signal into an audible signal.

As illustrated, a battery charger 50 is coupled to battery 30 within speaker housing 20. As mentioned above, battery charger 50 may also be part of holder 22.

A remote control 52 may also be used to control the operation of controller 16. For example, remote control 52 may control the volume, station, and source of controller 16. Remote control 52 may also be used to control the volume of speaker 26. In addition, remote control 52 may also control various other functions of speaker 26, if so included, such as bass, tone, balance or other audible signal characteristics. Remote control has a transmitter 54. Transmitter 54 may be an RF, infrared or other type of transmitter as will be evident to those skilled in the art. A receiver 55 coupled to controller 16 may be used to receive signals from remote control 52.

A cellular phone 56 may also be coupled to controller 16. Cellular phone 56 is preferably one permanently wired within the vehicle. Cellular phone 56 when ringing may provide a signal to controller 16. Controller 16 may generate a wireless ring signal to remote speaker 20. Thus, the presence of a ring signal would be known to the vehicle operator through the remote speaker 26.

Controller 16 is also coupled to an antenna 58 for reception of RF signals. For example, antenna 58 may be suitable for receiving AM and FM signals. In addition, antenna 58 may also be suitable for receiving satellite radio broadcasts.

Controller 16 may also be coupled to an indicator 60. Indicator 60 may be one of a number of types of indicators used in automotive vehicles. For example, indicator 60 may a portion of an LCD display, an indicator light, or a buzzer making an audible signal. Indicator 60 may be used to signal the vehicle operator upon start up of the vehicle that the speaker housing 20 has been left outside the vehicle. Thus, indicator 60 acts as a reminder to the vehicle operator to prevent leaving speaker housing 20 behind.

Figure 3:
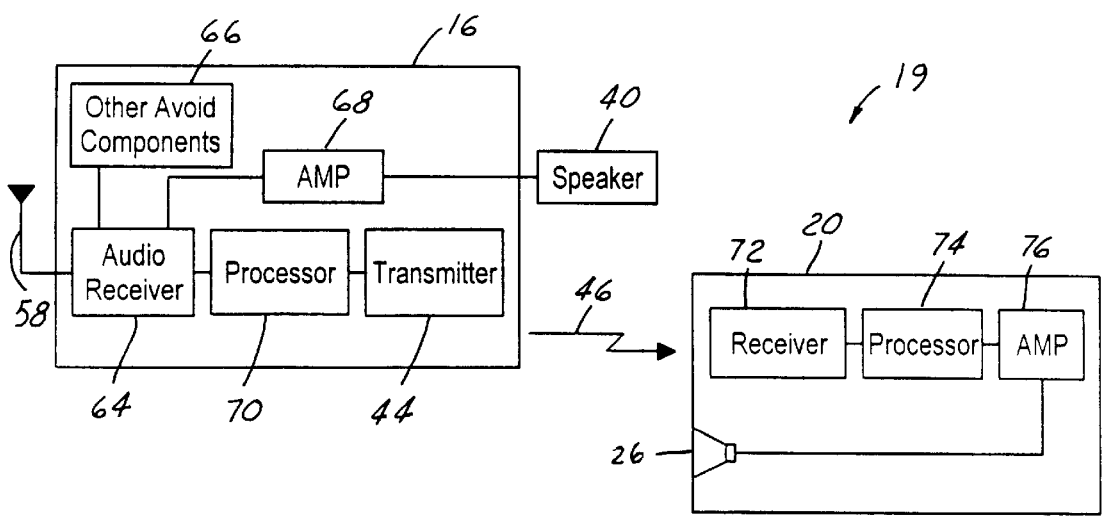
FIG. 3 is a more detailed block diagrammatic view of a transmitting circuit and receiving circuit for the controller and remote speaker of FIG. 2.

Referring now to FIG. 3, the controller 16 shown in FIGS. 1 and 2 is illustrated in greater detail. Also, speaker assembly 19 is also shown in greater detail. Controller 16 has an audio receiver 64 coupled to an antenna 58. Audio receiver 64 may be coupled to other audio components 66 such as a CD player, a digital audio tape player, or other audio components as would be evident to those skilled in the art. Audio receiver 64 receives the signals from antenna 58 or other audio components 66 and provides them to an amplifier 68. Amplifier 68 amplifies the audio signals from audio receiver 64 to a predetermined level before coupling the audio signal to hardwired speakers 40.

Audio receiver 64 is also coupled to a processor 70. Processor 70 is used to control the various functions of controller 16. Processor 70, for example, may convert signals from audio receiver 70 into signals that are to be transmitted by transmitter 44. Various types of processors would be evident to those skilled in the art.

Speaker assembly 19 has a receiver 72 coupled to a processor 74 which in turn is coupled to an amplifier 76. Amplifier 76 is coupled to speaker 26. Receiver 72 receives the wireless communication signal 46. Processor 74 converts the received signal into an audio signal. Amplifier 76 amplifies the signal prior to speaker 26.

Figure 4:
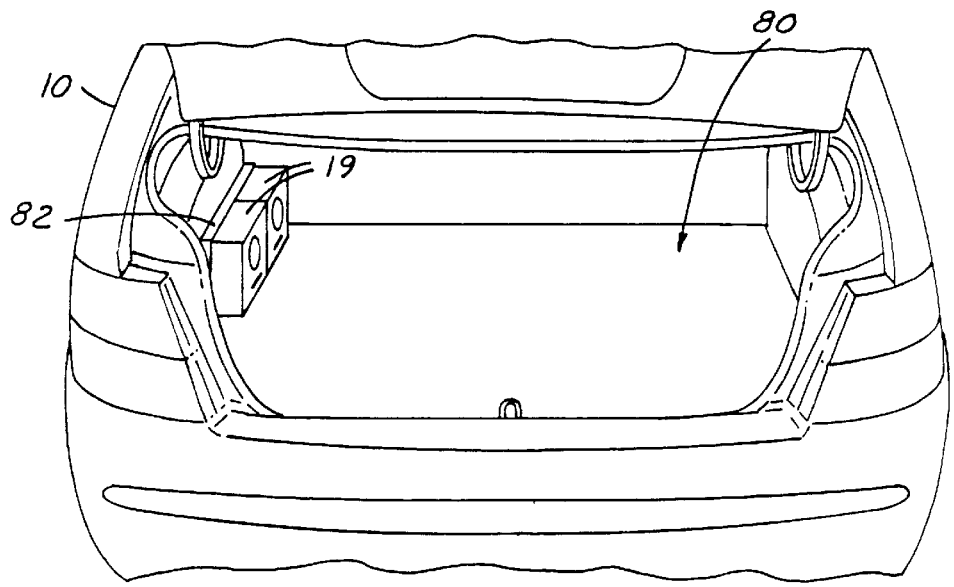
FIG. 4 is a perspective view of a trunk compartment showing an alternative view of remote speakers mounted therein.

Referring now to FIG. 4, an alternative embodiment to that shown above is illustrated. In this embodiment, the speaker assemblies 19 are located within a trunk 80 of automotive vehicle 10. Holder 82 is used to hold speakers 19. In this manner, holder 82 does not receive speakers 19 therein. Rather, speaker assemblies 19 are mounted to holder 82. When speakers are mounted within trunk 80, speakers do not provide audible signals from controller. Thus, speaker assemblies 19 must be removed from holder 82 for transmitting audible signals. This embodiment is particularly suitable for aftermarket applications. The wireless transmitting portions of controller 16 may be incorporated into holder 82. That is, holder 82 may include transmitter 44 that is activated when speakers 19 are removed from holder 82. While mounted in holder 82, the speakers recharge so they are ready to be used. Further, holder 82 may be made of a glow-in-the-dark material. Of course, those skilled in the art would recognize that the holder 82 may be located in various locations throughout the vehicle.

In operation, the speaker assemblies 19 may remain mounted in the vehicle during normal operation. When the remote feature of speakers 19 are desired, they are removed from holder 22 and placed in a desirable location within a predetermined distance from vehicle 10. Controller 16 may route signals to speakers 40 as well as in a wireless manner to speaker assemblies 19. Controller 16 transmits signals through transmitter 44 to the receiver 48 of speaker assembly 19. The audio signals are then generated by the speaker 26 within speaker assembly 19. When remote operation of speaker assembly 19 is no longer desired, the speaker assembly 19 is returned to housing 20. If the vehicle operator forgets to replace speakers, an indicator 60 preferably warns the driver that the speakers are not within the vehicle.

While particular embodiments of the invention have been shown and described, numerous variations alternate embodiments will occur to those skilled in the art. Accordingly, it is intended that the invention be limited only in terms of the appended claims.

What is claimed is:

1. A remote speaker system for an automotive vehicle comprising:

a holder fixedly mounted within said vehicle;

a speaker assembly having a speaker housing removably coupled to the holder, a speaker coupled within said housing and a receive circuit coupled within said housing and electrically coupled to said speaker;

an indicator coupled within the vehicle;

a controller coupled to the indicator, said controller having an audio receiver generating audio signals and a transmit circuit for transmitting a wireless communication signal in response to said audio signal, said controller activating said indicator in response to a vehicle operating condition and said speaker decoupled with said holder;

said receive circuit receiving said wireless communication signal and converting said wireless communication signal into an electrical audio signal; and said speaker converting said electrical audio signal into an audible signal.

2. A remote speaker system as recited in claim 1 wherein said speaker housing is sized to be coupled substantially within said holder.

3. A remote speaker system as recited in claim 1 wherein said speaker housing is located with a trunk enclosure of the automotive vehicle.

4. A remote speaker system as recited in claim 1 further comprising a remote control, wherein said remote control coupled to said controller.

5. A remote speaker system as recited in claim 1 further comprising a remote control, wherein said remote control coupled to said speaker assembly.

6. A remote speaker system as recited in claim 1 further comprising a cellular phone coupled to said controller.

7. A remote speaker system as recited in claim 6 wherein said controller transmits a ring signal so said speakers in response to a ringing of said cellular phone.

8. A remote speaker system as recited in claim 6 wherein said holder is mounted within a door.

9. A remote speaker system as recited in claim 8 wherein said holder is mounted within a door panel.

\* \* \* \* \*

UNITED STATES PATENT AND TRADEMARK OFFICE
CERTIFICATE OF CORRECTION

PATENT NO. : 6,731,761 B1  Page 1 of 1
APPLICATION NO. : 09/522,385
DATED : May 4, 2004
INVENTOR(S) : Daniel P. Zablocki et al.

It is certified that error appears in the above-identified patent and that said Letters Patent is hereby corrected as shown below:

Column 6,
line 10, should read as follows: -- said speaker housing is located within a trunk enclosure of the --

Column 6,
line 14, should read as follows: -- is coupled to said controller. --

Column 6,
line 17, should read as follows: -- is coupled to said speaker assembly. --

Column 6,
line 19, should read as follows -- comprising a cellular phone is coupled to said controller. --

Column 6,
line 21, should read as follows -- said controller transmits a ring signal to said speakers in Signed and Sealed this Eighteenth Day of July, 2006

JON W. DUDAS
*Director of the United States Patent and Trademark Office*